United States Patent [19]

Krauer

[11] Patent Number: 5,370,017
[45] Date of Patent: Dec. 6, 1994

[54] HANDLEBAR CABLE CONTROL WITH BIASED RETURN FEATURE

[76] Inventor: Alwin Krauer, 5336 N. Winthrop, Chicago, Ill. 60640

[21] Appl. No.: 88,129

[22] Filed: Jul. 7, 1993

[51] Int. Cl.⁵ .................. F16C 1/10; G05G 11/00; F16H 9/00
[52] U.S. Cl. ..................... 74/502.2; 74/489; 74/488; 474/80
[58] Field of Search ........ 74/502.2, 488, 489; 474/80, 81; 188/24.11, 24.14

[56] References Cited

U.S. PATENT DOCUMENTS

| | | |
|---|---|---|
| 359,536 | 3/1887 | Hazen et al. |
| 425,789 | 4/1890 | Hems . |
| 428,383 | 5/1890 | Elliott . |
| 575,936 | 1/1897 | Roso . |
| 591,994 | 10/1897 | Warren et al. |
| 603,706 | 5/1898 | Rausch . |
| 637,085 | 11/1899 | Chase . |
| 637,821 | 11/1899 | Paulson . |
| 1,034,674 | 8/1912 | Austin ............... 74/489 |
| 1,114,440 | 10/1914 | Brix ................... 74/488 |
| 1,231,055 | 6/1917 | Packard . |
| 1,449,349 | 3/1923 | Pullin . |
| 2,271,273 | 1/1942 | Mueller . |
| 2,387,020 | 11/1945 | Helme . |
| 2,601,752 | 7/1952 | Rose ................... 74/488 |
| 2,715,792 | 8/1955 | Magnusson ........... 74/488 |
| 2,776,579 | 1/1957 | Nichel ................. 74/488 |
| 2,788,676 | 4/1957 | Spexarth . |
| 2,830,463 | 4/1958 | Irgens . |
| 2,874,587 | 2/1959 | Schmid . |
| 4,137,793 | 2/1979 | Sowell ................. 74/488 |
| 4,225,124 | 9/1980 | Pollack . |
| 4,653,613 | 3/1987 | Blancas . |
| 4,900,291 | 2/1990 | Patterson ............. 474/80 |
| 4,938,733 | 7/1990 | Patterson ............. 474/80 |
| 4,966,047 | 10/1990 | Krauer et al. |

FOREIGN PATENT DOCUMENTS

| | | |
|---|---|---|
| 516475 | 1/1953 | Belgium . |
| 435160 | 2/1912 | France . |
| 968972 | 12/1950 | France . |
| 1109346 | 1/1956 | France . |
| 284485 | 4/1931 | Italy . |
| 294968 | 4/1932 | Italy . |
| 312039 | 10/1933 | Italy . |
| 399020 | 10/1942 | Italy . |
| 425312 | 9/1947 | Italy . |
| 455397 | 2/1950 | Italy . |
| 460899 | 12/1950 | Italy . |
| 201491 | 2/1939 | Switzerland . |
| 237541 | 8/1945 | Switzerland . |
| 348062 | 9/1960 | Switzerland . |
| 013520 | of 1902 | United Kingdom . |
| 349765 | 6/1931 | United Kingdom . |
| 354111 | 8/1931 | United Kingdom . |
| 431197 | 6/1935 | United Kingdom . |
| 901937 | 7/1962 | United Kingdom . |

*Primary Examiner*—Vinh T. Luong
*Attorney, Agent, or Firm*—Greer, Burns & Crain, Ltd.

[57] ABSTRACT

A handlebar mounted brake control mechanism for a Bowden brake cable or the like includes a handlebar having at least one end, a tubular handle member having first and second ends configured to telescopically slide over one end of the handlebar and being coaxially rotatable thereabout between a relaxed position and a braking position. A handle member biasing mechanism is located on the handlebar for biasing the handle member into the relaxed position, and a handle member guide is used to axially displace the handle member reciprocally between the relaxed position and the braking position. The handle member biasing mechanism is configured such that when the overriding force applied by the user to rotate the handle member into the braking position is released, the handle member biasing mechanism returns the handle member to the relaxed position from the braking position. Additionally, the handle member has an attachment for releasably accommodating an end of the brake cable.

15 Claims, 1 Drawing Sheet

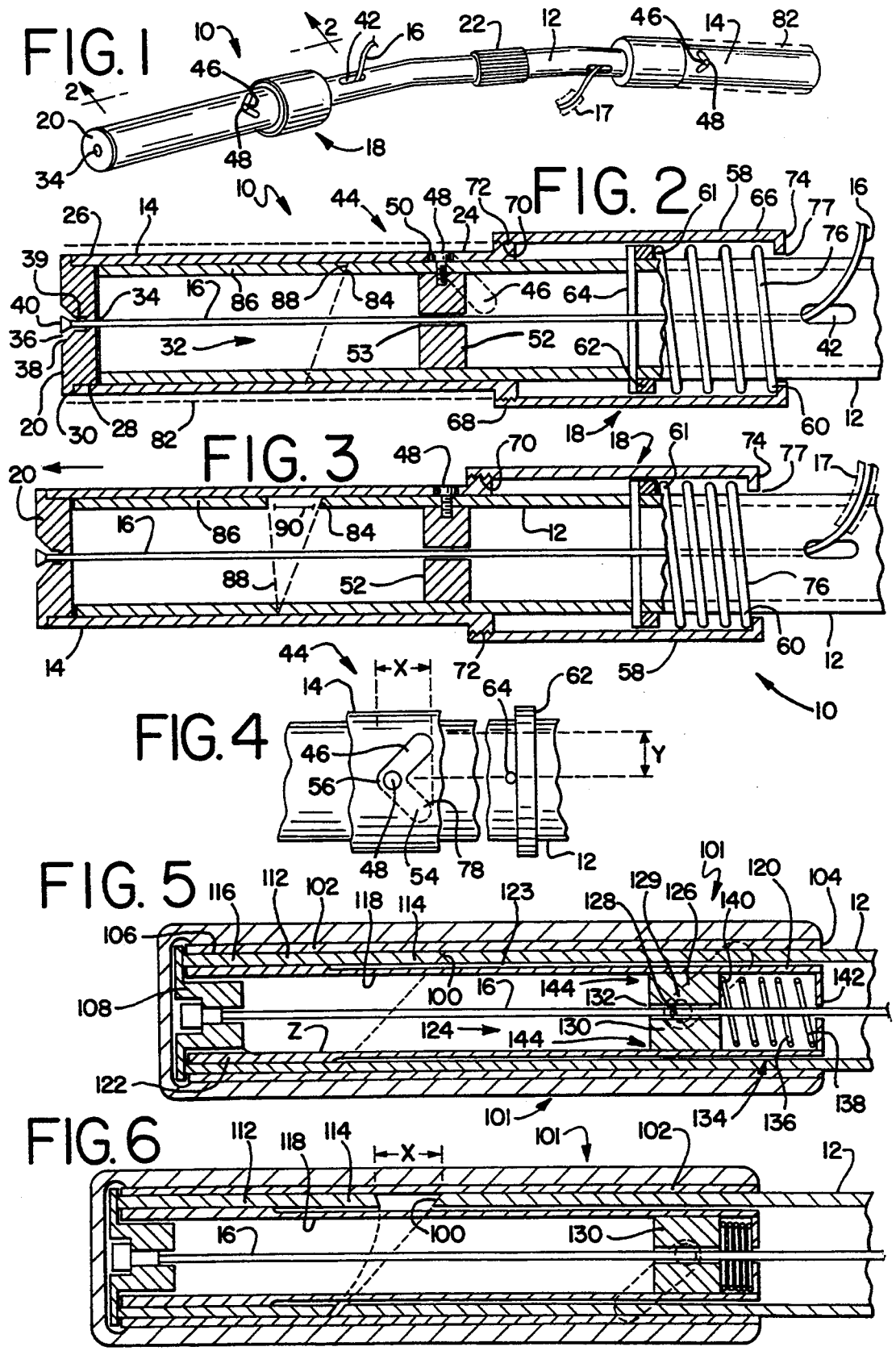

HANDLEBAR CABLE CONTROL WITH BIASED RETURN FEATURE

BACKGROUND OF THE INVENTION

1. Field of the Invention

This invention relates generally to handlebar-mounted cable controls for caliper-type bicycle brakes or other cable operated devices, and more particularly, to such a cable control mounted at the end of a handlebar for coaxial rotation thereabout.

2. Description of the Related Art

Handlebar-mounted bicycle caliper brake cable controls generally are provided in two basic configurations. The first employs a lever-type hand control whereby the rider, whose hands are positioned on the handlebar, must extend his fingers to grasp the lever and pull it towards the handlebar. The rider moves the lever, connected by a sheathed brake cable (Bowden cable) to the caliper brake, to overcome a spring-loaded biasing force which normally maintains the calipers in an open position, to clamp the brake shoes against the wheel rim to stop the bicycle.

This prior art configuration has several drawbacks, including the fact that in emergency situations, the rider must quickly move his hands to the correct position on the handlebar to activate the brake lever in time to stop the bicycle. If the rider's reaction is delayed, the brake levers may not be properly gripped, and the bicycle may not be stopped when desired.

A further drawback of the lever type brake control is that a certain amount of finger strength is required to exert sufficient force on the lever to obtain positive braking. Riders with relatively weak hands and fingers, such as children and the elderly, may have difficulty exerting sufficient force on lever type brake controls to obtain positive braking. Also, these two groups of riders often have inherently slower emergency reaction times, thus increasing the potential for accidents due to a failure to maintain proper brake control.

The second prior art type of handlebar-mounted brake cable control employs a hollow hand grip member axially rotatable about the ends of the handlebar. To activate the brakes, the rider twists the hand grip member, which is connected to the brake by a cable in a fashion similar to the lever type control described previously. The hand grip type of control obviates some of the drawbacks of the lever type control in that the omission of the lever removes the necessity to place the hands in as specific a location on the handlebar prior to braking. This decreases the emergency reaction time. In addition, the rider does not have to loosen his grip on the handlebar to activate the brakes. The rider merely rotates the grip by twisting his wrists, the muscles of which normally are stronger than the finger muscles. Thus, the hand grip type of brake control permits faster reaction time and requires less effort to operate.

Conventional rotatable hand grip brake cable controls have not been widely accepted. This is due in part to the relatively complex linkages and brackets normally found on such devices, which are also relatively expensive to manufacture, assemble and maintain compared to the lever type controls. Furthermore, in conventional rotatable hand grip controls, portions of the cable linkage related thereto are often mounted on the exterior of the handlebar, where they are exposed to damage, corrosion, and may cause injury to the rider, especially in emergency situations when the rider must move his hands quickly along the handlebar to the hand grip controls.

Additionally, prior art rotatable hand grip controls have several drawbacks. First, the spring-loaded biasing force which normally maintains the calipers in an open position is used to bias the rotatable handle member back into the non-braking position. Often, this force is insufficient to cause the handle grip to fully rotate back into the non-braking position. Thus, in some cases, the brakes may be left in a partially activated state after release.

Second, some prior art rotatable and grip controls rely on complementary angled surfaces to provide the pull on the cable when rotated relative to each other. In some cases, rough road conditions or rider inattention may cause the brake to engage inadvertently though unintentional hand or wrist movement. This occurs because the spring-loaded biasing force on the brakes which normally maintains the calipers in an open position is insufficient to counteract the force exerted by the inadvertent hand or wrist rotation.

Third, since the brake cable is directly attached to the handle grip member, failure of the brake cable in some situations may cause the handle grip member to detach from the handlebar. This may result in loss of control and injury to the rider.

It is therefore an object of the present invention to provide a bicycle brake control which is easily accessible in emergencies.

It is another object of the present invention to provide a bicycle brake control that requires relatively little force to activate yet is resistant to inadvertent hand and wrist rotations.

It is yet another object of the present invention to provide a bicycle brake control that easily returns to the non-braking position after release.

It is additionally an object of the present invention to provide a bicycle brake control which will not permit detachment of the handle member should the brake cable fail.

It is still a further object of the present invention to provide a bicycle brake control that is simple and inexpensive to manufacture and assemble and has a minimum of exposed components.

SUMMARY OF THE INVENTION

The disadvantages of the prior art controls are overcome in accordance with the present invention by providing a brake cable control including a twist grip brake control handle mounted to an end of a bicycle handlebar which enables rapid activation of the brakes with minimum effort. The brake cable control invention features a brake handle member designed to resist unintentional rotation and also features a handle member designed to be retained on the end of the handlebar even if the cable breaks.

More specifically, a handlebar mounted brake cable control mechanism for controlling a Bowden cable is provided with a tubular handle member having first and second ends configured to telescopically slide over one end of the handlebar and being coaxially rotatable thereabout between a first position and a second position. A handle member biasing mechanism is located on the handlebar for biasing the handle member into a first or relaxed position, and a handle member guide is used to axially and reciprocally displace the handle member between the first position and the second or braking position.

The handle member biasing mechanism is configured such that when an overriding force applied by the user to rotate the handle member into the second braking position is released, the handle member biasing mechanism returns the handle member to the first position from the second position. Additionally, the handle member has an attachment for releasably accommodating an end of the brake cable. As the handle member is rotated, the brake cable is pulled, activating the brake.

In a preferred embodiment separate brake controls are provided for the front and rear brakes, one control located at each end of the handlebar. In addition, both the front and rear brake cables may be partially concealed within the handlebar, and may also be concealed within the portions of the frame.

BRIEF DESCRIPTION OF THE DRAWING

FIG. 1 is a top perspective elevational view of a handlebar incorporating the present cable control;

FIG. 2 is sectional view of the handlebar cable control depicted in FIG. 1 taken along line 2—2 and in the direction generally indicated, and particularly showing the handlebar cable control in the first or relaxed position;

FIG. 3 is the same view as shown in FIG. 2 but particularly showing the handlebar cable control in the second or braking position;

FIG. 4 is a fragmentary perspective elevational view of the handlebar cable control depicted in FIG. 1.

FIG. 5 is a vertical sectional view of an alternate embodiment of the handlebar control of FIG. 2 shown in the relaxed position; and FIG. 6 is a vertical sectional view of the handlebar control shown in FIG. 5 depicted in the braking position.

DESCRIPTION OF THE PREFERRED EMBODIMENT

Referring now to FIG. 1, the handlebar cable control invention designated generally by reference numeral 10 is designed to be mounted at one end of a handlebar 12, As depicted, the handlebar 12 is of the type used on bicycles, however, the present invention may also be used on handlebar equipped motorcycles or other vehicles. Preferably, there is a handlebar cable control 10 for each end of the handlebar 12, one cable control to actuate the front caliper brake (not shown) and one to actuate the rear caliper brake (not shown). However, it is contemplated that in some cases the bicycle or vehicle may be provided with only a single caliper brake. In the latter case, only one end of the handlebar 12 will be provided with the handlebar cable control 10. Each handlebar cable control 10 includes a tubular handle member 14 and is connected to its respective caliper brake by a Bowden cable 16 having a sheath 17 (shown in phantom).

A handle member biasing mechanism 18, and a handle member cap 20 are found at each end of the handlebar 12. The components of the handlebar cable control 10 are fabricated of rigid materials such as alloy steel, magnesium alloy, aluminum, and/or polymeric materials designed for high strength and low weight. The handlebar 12 is generally mounted to a bicycle or similar vehicle along the midpoint of the handlebar 12 using a plurality of coaxial peripherally located handlebar friction grooves 22.

Referring now to FIG. 2, the tubular handle member 14 is shown to be telescopically positioned over the end of the handlebar 12. The tubular handle member 14 has a first end 24 and a second end 26, and is fitted on the second 26 end with the handle member cap 20. A shank 28 of the handle member cap 20 fits snugly into the second open end 26 of the tubular handle member 14 and may be secured to the handle member by a fastener (not shown) or merely by a pressure fit as is well known in the art.

A radially projecting lip 30 of the handle member cap 20 is flush at a peripheral edge with the outside diameter of the handle member 14, thus preventing the handle member cap from being drawn into an interior portion 32 of the handle member. The handle member cap 20 has a center aperture 34 which is counterbored 36 on an outside surface 38 of the cap. An end 39 of the Bowden cable 16 is fitted with a cable stop or barrel 40 dimensioned to fit into the counterbore 36 while the body of the Bowden cable is threaded through the center aperture 34 and continues along the inside length of the handlebar 12. The Bowden cable 16 is eventually routed to one of the caliper brakes and may be partially enclosed within the various structural members (not shown) of the bicycle or vehicle or it may exit the handlebar 12 through a conveniently placed cable exit 42. An exemplary arrangement of a Bowden cable concealed within a bicycle in this manner is disclosed in my prior U.S. Pat. No. 4,966,047 which is incorporated by reference herein. When the handle member 14 is rotated and axially displaced relative to the handlebar 12, axial tension will be exerted on the Bowden cable 16, thus activating the attached brake caliper.

Referring now to FIGS. 2 and 3, the tubular handle member 14 may be reciprocally rotated between a first position shown in FIG. 2 and a second position shown in FIG. 3. The first position is referred to as the non-braking or relaxed position, since the cable 16 is not subject to axial tension. The second position is referred to as the braking position since the tubular handle member 14 is axially displaced relative to the handlebar 12 causing axial tension on the Bowden cable 16.

To apply the brakes, in the preferred embodiment, the user rotates the handle member 14 in a rearward direction or toward the body. To release the brakes, the handle member 14 is rotated in a reverse direction or away from the body. If desired, this orientation may be reversed.

As the handle member 14 is reciprocally rotated between the first and second positions, a handle member guide mechanism 44 causes the tubular handle member to be axially displaced relative to the handlebar 12. The handle member guide mechanism 44 includes a slot 46 shown hidden in the tubular handle member 14 which in the preferred embodiment. The slot 46 is diagonal relative to a longitudinal axis of the handle member and a guiding stud 48 is shown secured in an aperture 50 in the handlebar 12. In the preferred embodiment, the guiding stud 48 is a threaded fastener, and is provided with a thickened, disk-shaped guiding stud retainer 52 positioned in the interior of the handlebar 12 to which the guiding stud is securely fastened. Additionally, the guiding stud retainer 52 has a center aperture 53 through which the Bowden cable 16 may be threaded. It is also contemplated that other arrangements for securing the guiding stud 48 in the handlebar 12 may be employed. These include, but are not limited to a locknut arrangement or a suitable chemical adhesive.

Referring now to FIG. 2, the tubular handle member 14 is telescopically positioned over the handlebar 12 so that the diagonal slot 46 in the handle member 14 is aligned over and captures the protruding guiding stud 48. When the tubular handle member 14 is rotated axially upon the handlebar 12, the angular rotation is limited by the length of the slot 46 engaged by the guiding stud 48. Since the slot 46 is diagonal relative to the axis of the tubular handle member 14, rotation of the handle member will translate into axial displacement of the handle member relative to the guiding stud 48 and the handlebar 12.

Referring now to FIG. 4, the amount of axial displacement of the tubular handle member 14 is governed by the axial longitudinal distance between a first endpoint 54 and a second endpoint 56 of the diagonal slot 46, shown as distance "X". The maximum rotation permitted is governed by the guiding stud 48 relative to each endpoint 54, 56. Hence, the maximum axial displacement of the handle member 14 is governed by axial distance between the two endpoints 54 and 56.

Referring now to FIG. 2, the handle member biasing mechanism 18 is shown in the first or relaxed position. The handle member biasing mechanism 18 includes a tubular spring enclosure 58, an annular stop collar 62, a stop collar pin 64 and a compressible spring 76. The tubular spring enclosure 58 telescopically slides over the handlebar 12 and is open at a first end 66 and a second end 68. The second end 68 of the tubular spring enclosure 58 is configured to be coupled to the tubular handle member 14, and in the preferred embodiment has a threaded interior 70 to engage the corresponding first end 24 of the tubular handle member which has a threaded exterior surface 72.

When the tubular spring enclosure 58 is coupled to the tubular handle member 14 through the respective threaded ends 70 and 72, the tubular handle member and the tubular spring enclosure act as a single rigid assembly. The non-threaded or first open end 66 of the tubular spring enclosure 58 is provided with an annular shoulder 74 that provides a surface against which the coiled spring 76 may abut. An opening 77 is defined by the shoulder 74 and is dimensioned to slidingly accommodate the handlebar 12.

The coiled spring 76 is configured to slide over the handlebar 12 and is also configured to be accommodated within the interior of the tubular spring enclosure 58. A first end 60 of the coiled spring 76 is retained by the enclosure shoulder 74. A second end 61 of the coiled spring 76 abuts and is retained by the stop collar 62 which is fixed to the handlebar 12. The stop collar 62 slides over the handlebar 12 and is securely held in place by the stop collar pin 64. The stop collar pin 64 penetrates the diameter of the handlebar 12 and protrudes from both sides of the handlebar. However, the present invention is not limited to this particular embodiment, and alternate methods of fixing the stop collar 62 in place are contemplated. The purpose of the stop collar 62 and the stop collar pin 64 are to provide a fixed surface against which the second end 61 of the coiled spring 76 may abut. The tubular handle member 14 is shown coupled to the tubular spring enclosure 58 through their respective threads 72 and 70. As shown, the assembly is in the relaxed or non-braking state. In this state, the coiled spring 76 is uncompressed and fully extended.

Referring now to FIG. 3, the present handlebar cable control 10 is shown in the braking position. Here the user is applying rotational force which overrides the biasing force exerted by the spring 76, causing the tubular handle member 14 to rotate into the second position. Thus, the handle member is axially displaced relative to the handlebar 12. The axial displacement of the handle member 14 and the coupled tubular spring enclosure 58 cause the coiled spring 76 to be compressed by the enclosure shoulder 74, since the second end of the coiled spring 61 abuts the stop collar 62. When the user releases the tubular handle member 14 or rotates the tubular handle member in the opposite direction, the handle member and spring enclosure 58 assembly are axially displaced in the opposite direction and are returned to the first position.

The return of the handle member 14 to the relaxed position is accomplished by the handle member biasing mechanism 18, and more particularly by the stored force of the compressed coiled spring 76. As the overriding force applied by the user is released, the compressed coiled spring 76 aids in returning the handle member 14 back into the first position by pressing against the enclosure shoulder 74. Moreover, the spring tension of the coiled spring 76 is sufficient to resist unintentional hand and wrist rotation, yet is weak enough so that little force is required to activate the braking mechanism.

Referring now to FIG. 4, a more detailed view of the handle member guide mechanism 44 is shown. When the tubular handle member rotates, the diagonal slot 46 in the tubular handle member 14 rotates and is engaged by the guiding stud 48. The maximum amount of rotation allowed is governed by the length of the diagonal slot 46 with respect to the first end point 54 and the second endpoint 56, shown as distance "Y". Thus, it can be seen that when the tubular handle member 14 is rotated, the interaction of the diagonal slot 46 and the guiding stud 48 will cause the handle member to be axially displaced relative to the handlebar 12 as the diagonal slot travels the path engaged by the guiding stud.

Note that in the preferred embodiment there is a single diagonal slot 46 in the tubular handle member 14. This provides for rotation of the tubular handle member 14 in one direction only (rearward direction) to axially displace the handle member into the second braking position. However, an alternate embodiment is also contemplated where a second optional diagonal slot 78 is added. The diagonal slot 46 in conjunction with the second diagonal slot 78, forms a general "V" shape. This provides for both forward and backward rotational movement of the handle member 14 to engage the handle member into the second braking position at the option of the user. It is also contemplated that the slot 46 may be oriented for forward only rotation, as desired.

Referring now to FIG. 2, the diagonal slot 46 is engaged by the guiding stud 48. Since the guiding stud 48 is fixed to the handlebar 12 and is engaged by the diagonal slot 46 in the tubular handle member 14, the handle member cannot detach from the handlebar 12 if the Bowden cable 16 fails.

In some cases, a resilient covering 82 (shown in phantom) may be provided for the handle member 14 to facilitate a positive grip thereon. The resilient covering 82 may be fabricated of spongy rubber or plastic or equivalent materials, and may be fixed to the handle member with a suitable chemical adhesive.

It is also contemplated that the guiding action caused by the engagement of the guiding stud 48 in the guiding slot 46 may be structurally supported by the sliding action of complementary, angled surfaces operating as described in my prior U.S. Pat. No. 4,966,047. In the present embodiment, the end 84 of the handlebar 12 is shortened and cut at an angle relative to the horizontal. An insert 86 is secured into the end 26 of the tubular handle member 14 and is provided with an angled face 88 which is complementary to the angled end 84 of the handlebar 12. Thus, the surfaces 84, 88 slide relative to each other. As the handle member 14 is axially rotated, the angled relationship of the surfaces 84, 88 will create an axial displacement 90 (best seen in FIG. 3) which corresponds to the length of the slot 46. In applications where the insert 86 and angled handlebar end 84 are not employed, the handlebar projects almost to the end 26 of the tubular handle member 14 to provide sliding support for the handle member.

Referring now to FIGS. 5 and 6, an alternate embodiment is shown. The basic difference between the embodiments of FIGS. 2 and 3 and FIGS. 5 and 6 is that in FIGS. 2 and 3, the spring is external to the handlebar while in the embodiment of FIGS. 5 and 6, the spring is internal to the handlebar.

Referring now to FIG. 5, each end of the handlebar 12 is shaped to have a cross-sectional angled end 100. A handle member assembly 101 includes a tubular handle member 102 having a first end 104 and a second end 106, a handle member cap 108 secured to the second end 106 of the handle member, a handle member angled insert 112 having a first end 114 and second end 116, and a handle member biasing insert 118 having a first end 120 and a second end 122. The angled insert 112 is telescopically positioned within the handle member 102 such that the second end 116 of the angled insert is flush with the second end 106 or peripheral end of the handle member 102. The angled insert 112 is secured within the handle member 102 by a fastener, chemical adhesive, or merely by a pressure fit as is well known in the art.

The first end 114 of the angled insert 112 is provided with a cross-sectional angled end formed approximately 45 degrees relative to its longitudinal axis. The angled cross-sectional end 114 is in physical proximity with the angled cross-sectional end 100 of the handlebar 12. The angled insert 112 is coaxially fixed within the handle member 102 and its outside diameter approximately equals the outside diameter of the handlebar 12. The handle member 102 telescopically slides over the end 100 of handlebar 12 and the angled insert 112 extends along a portion of the inside length of the handle member 102. Thus, the first or angled end 114 of the angled insert abuts the complementary cross-sectional angled end 100 of the handlebar 12 when the handle member 102 is slidingly positioned over the cross-sectional angled end of the handlebar.

Again, as in the preferred embodiment, the handle member 102 may be reciprocally rotated between a first position shown in FIG. 5 and a second position shown in FIG. 6. The first position is the non-braking or relaxed position, since the Bowden cable 16 is not subject to axial tension. The second position is the braking position, since the axial displacement of the handle member 102 relative to the end 100 of the handlebar causes axial tension on the Bowden cable 16.

The handle member biasing bracket 118 is coaxially positioned within the angled insert 112 and is fixed therein by a suitable fastener or merely by a pressure fit as is well known in the art. A second end 122 of the biasing bracket 118 is flush with a second end or peripheral end 116 of the angled insert 112 and is also flush with the second end 106 or peripheral end of the handle member 102. The biasing bracket 118 positioned within the angled insert 112 projects inwardly beyond the first end 114 of the angled insert and into the inner portion 124 of the handlebar 12.

To allow the first end 120 (projecting end) of the biasing bracket 118 to fit within the interior 124 of the handlebar 12 and freely rotate therein, the outside diameter of the biasing bracket is reduced beginning at a point between the second end 122 or peripheral end of the biasing bracket and the beginning of the angled end 114 of the angled insert 112. The point where the diameter reduces is shown as "Z". This provides a slight gap 123 between the outside surface of the biasing insert 118 and the inside surface of the handlebar 12, thus allowing the biasing insert 118 to freely rotate within the handlebar 12 when the handle member 102 is rotated.

The cross-sectional angled end 114 of the angled insert 112 is complementary to the cross-sectional angled end 100 of the handlebar 12. Additionally, since the inside and outside diameter of the angled insert 112 is approximately equal to the inside and outside diameter of the handlebar 12, the two angled ends 114 and 100 abut. Thus, when the handle member 102 is rotated about the handlebar 12, the angled insert 112 fixed within the handle member 102 also rotates. As the cross-sectional angled end 114 of the angled insert 112 rotates, the handle member assembly 110 is displaced axially relative to the handlebar 12 due to the separation of the two angled surfaces 100, 114. The greater arch of rotation, the greater separation will be created between the angled insert cross-sectional angled end 114 and the cross-sectional angled end 100 of the handlebar 12. Thus, the handle member is axially displaced relative to the handlebar.

Referring now to FIG. 6, the handlebar control is shown in the second or braking position as was described in the preferred embodiment. The axial displacement of the handle member assembly 101 relative to the handlebar causes axial tension to be applied to the cable 16, thus engaging the brake caliper (not shown).

Referring now to FIG. 5, the handle member 102 includes a slot 126 which is diagonal relative to the longitudinal axis of the handle member. As in the preferred embodiment, a stud 128 (shown hidden) is secured in an aperture 129 in the handlebar 12 and is provided with a stud retainer 130 positioned within the interior of the handlebar to which the stud is securely fastened. Additionally, the stud retainer 130 has a center aperture 132 through which the Bowden cable 16 may be threaded. The handle member assembly 101 is telescopically positioned over the handlebar 12 so that the diagonal slot 126 in the handle member 102 is aligned over and captures the stud 128. The stud 128 protrudes from the surface of the handlebar 12 so that the diagonal slot 126 in the handle member 102 is engaged by the stud. When the handle member 102 is rotated upon the handlebar 12 the angular rotation is limited by the length of the diagonal slot engaged by the stud 128. Additionally, the stud will retain the handle member 102 on the handlebar 12 if the cable 16 fails.

A handle member biasing mechanism 134 includes the handle member biasing bracket 118, the stud 128, the stud retainer 130, a coiled spring 136 having a first end 138 and a second end 140, and a shoulder 142 formed at the first end 120 of the biasing bracket 118. The coiled spring 136 is positioned within the biasing insert 118 such that the first end 138 of the coiled spring abuts the shoulder 142 of the handle member biasing insert. The second end 140 of the coiled spring 136 abuts the stud retainer 130.

When the handle member 102 is rotated into the second position, the handle member assembly 101 is axially displaced from the handlebar as the cross-sectional angled end 114 of the angled insert 112 separates from the cross-sectional angled end 100 of the handlebar 12. Since the biasing bracket 118 moves with the handle member 102, it is also axially displaced relative to the handlebar 12, and the coiled spring 136 is compressed between the shoulder 142 of the biasing bracket 118 and the stud retainer 130. When the handle member assembly 101 is rotated in the opposite direction or an overriding force applied by the user is released, the stored tension or biasing force in the coiled spring 136 causes the handle member assembly to rotate back into the first position. At the same time, the axial tension applied to the Bowden cable 16 is released.

Referring now to FIG. 6, the handle member 102 is shown rotated into the second or braking position and is axially displaced relative to the handlebar as shown by the distance "X". This distance represents the maximum distance between the cross-sectional angled and 114 of the angled insert 112 and the complementary cross-sectional angled end 100 of the handlebar 102.

Referring now to FIG. 5, the stud retainer 130 is shown mounted within the handle member biasing bracket 118. The first end 120 of the biasing insert 118 is allowed to freely rotate unimpeded by the stud retainer 130. To accomplish this, the stud retainer 130 is preferably smaller in diameter than the inside diameter of the biasing bracket 118. At the point where the biasing bracket 118 is in proximity with the stud retainer 130, the biasing bracket is cut away such that only two arms 144 of the biasing insert remain. Note that the stud retainer still provides a fixed surface sufficient to retain the second end 140 of the coiled spring 136.

The stud retainer 130 must be small enough in diameter to allow the biasing insert arms 144 to freely rotate about the stud retainer 130 while simultaneously providing a surface against which the second end 140 of the coiled spring 136 may abut. Note that the biasing arms 144 cannot rotate freely about the stud retainer 130 through a complete rotation. At some point along the rotation, the biasing arms 144 will abut the stud retainer 130 at the point where the stud 128 is secured to the stud retainer. However, the degree of rotation afforded the biasing arms 144 and thus afforded the handle member 102 is sufficient to allow the handle member to be reciprocally rotated between the first and second positions. The degree of rotation of the handle member 102 and handle member assembly 101 is substantially equal to the path defined by the diagonal slot 126 engaged by the stud 128.

However, other methods of providing a stud retainer sufficient to allow rotation of the biasing bracket 118 are contemplated. These include but are not limited to a locknut arrangement or an irregular shaped stud retainer 130.

While the preferred embodiment of the present handle bar cable control has been shown and described, it will be appreciated by those skilled in the art that changes and modifications may be made thereto without departing from the spirit and scope of the invention in its broader aspects and as set forth in the following claims.

What is claimed is:

1. A handlebar mounted brake control mechanism for a Bowden brake cable comprising:
   a handlebar having at least one end;
   a tubular handle member having first and second ends configured to telescopically slide over said at least one end of said handlebar and being coaxially rotatable thereabout between a first position and a second position;
   handle member biasing means disposed on said handlebar for biasing said handle member into said first position; and
   handle member guiding means for axially displacing said handle member reciprocally between said first position and said second position;
   a handle member cap being engaged at said second end of said handle member and having a cable restraining end configured for releasably accommodating an end of the cable, said axial displacement of said handle member exerting an axial pulling action on the brake cable; and
   said handle member biasing means being configured for returning said handle member to said first position from said second position upon the release of overriding force applied by the user.

2. The brake control mechanism as defined in claim 1 wherein said first position of said handle member is a relaxed position and said second position of said handle member is a braking position wherein axial tension is applied to the brake cable.

3. The brake control mechanism as defined in claim 1 wherein said handle member guiding means further comprises:
   a diagonal slot in said handle member; and
   a guiding stud affixed to said handlebar and protruding therefrom to slidingly engage said diagonal slot when said handle member is coaxially rotated between said first position and said second position to axially displace said handle member relative to said handlebar.

4. The brake control mechanism as defined in claim 3 wherein said slot is defined by a first endpoint and a second endpoint such that coaxial rotation of said handle member relative to said guiding stud causes said handle member to be displaced axially relative to said handlebar a fixed distance substantially equal to the axial distance defined by said endpoints.

5. The brake control mechanism as defined in claim 1 wherein said handle member biasing means further comprises:
   a tubular spring enclosure having first open end and a second open end and configured to telescopically slide over said handlebar;
   said tubular spring enclosure configured to provide a first spring retaining means at said first open end;
   said second open end of said spring enclosure is configured to engage said first end of said handle member.

6. The brake control mechanism as defined in claim 5 wherein said handle biasing means further includes:
   a second spring retaining means affixed to said handlebar and protruding therefrom at a point between said first spring retaining means on said tubular spring enclosure and said guiding stud affixed to said handlebar; and a coiled spring configured to slide over said handlebar and configured to be slidingly accommodated within said spring enclosure so that upon attachment of said tubular spring enclosure to said handle member, said spring is retained between said first spring retaining means of said tubular spring enclosure and said second spring retaining means.

7. The brake control mechanism as defined in claim 6 wherein said second open end of said tubular spring enclosure is attached to said first end of said handle member such that said spring is biased between said first spring retaining means and said second retaining means, and said biasing means biases said handle member into said first position.

8. The brake control mechanism as defined in claim 6 wherein said second spring retaining means further comprises:
- a pin penetrating the diameter of said handlebar and protruding therefrom on at least one side of said handlebar; and
- a stop collar configured to telescopically slide over said handlebar and abut against said pin;
- wherein said spring is accommodated between said first spring retaining means of said tubular spring enclosure and said stop collar.

9. The brake control mechanism as defined in claim 1 further including cable means on said cap for releasably and securely accommodating an end of the brake cable thereto.

10. The brake control mechanism as defined in claim 1 wherein said tubular handle member is surrounded with a resilient grip material.

11. The brake control mechanism as defined in claim 1 wherein said handle member guiding means further comprises:
- a generally 'V'-shaped slot in said handle member having a first slot path and a second slot path meeting at a vertex;
- a guiding stud affixed to said handlebar and protruding therefrom to slidingly engage said generally 'V' shaped slot when said handle member is coaxially rotated between said first position and said second position to axially displace said handle member relative to said handlebar;
- wherein coaxial rotation of said handle member in a forward direction will slidingly engage said first slot path when said handle member is coaxially rotated between said first position and said second position to axially displace said handle member relative to said handlebar; and
- wherein coaxial rotation of said handle member in a backwards direction will slidingly engage said second slot path when said handle member is coaxially rotated between said first position and said second position to axially displace said handle member relative to said handlebar.

12. A handlebar mounted brake control mechanism for use with a Bowden brake cable comprising:
- a handlebar having at least one end;
- a tubular handle member having first and second ends configured to telescopically slide over said at least one end of said handlebar and being coaxially rotatable thereabout between a first position and a second position;
- handle member biasing means disposed on said handlebar for biasing said handle member into said first position, said handle member biasing means including a compressible spring retained at one end at a fixed point on said handlebar and retained on an opposite end by said handle member and being compressible in relation the axial displacement of said handle member into said second position;
- handle member guiding means for axially displacing said handle member reciprocally between said first position and said second position;
- a handle member cap being engaged at said second end of said handle member and having a cable restraining end configured for releasably accommodating an end of the cable, said axial displacement of said handle member exerting an axial pulling action on the brake cable; and
- said handle member biasing means being configured for returning said handle member to said first position from said second position upon the release of overriding force applied by the user.

13. The brake control mechanism as defined in claim 12 wherein said compressible spring retained on one end at a fixed point further includes:
- a pin penetrating the diameter of said handlebar and protruding therefrom on both sides of said handlebar; and
- a stop collar configured to telescopically slide over said handlebar and abut against said pin.

14. A brake control mechanism as defined in claim 12 wherein said fixed point for retaining an end of said spring is located between said spring and said second end of said handle member.

15. A handlebar mounted brake control mechanism for a Bowden brake cable or the like comprising:
- a handlebar having at least one end;
- a handle member cap having a cable restraining end;
- a tubular handle member having first and second ends configured to telescopically slide over said at least one end of said handlebar and being coaxially rotatable thereabout between a first position and a second position;
- handle member biasing means disposed on said handlebar for biasing said handle member into said first position; and
- handle member guiding means for axially displacing said handle member reciprocally between said first position and said second position; and
- said handle member biasing means being configured such that when overriding force applied by the user to rotate said handle member into said second position is released, said handle member biasing means returns said handle member to said first position from said second position;
- said handle member cap being accommodated within said second end of said handle member and protruding therefrom forming a substantially flush surface with said second end of said handle member; and
- said cable restraining end of said cap configured to releasably accommodate an end of the brake cable such that when said handle member is axially displaced, said cable restraining end of said cap exerts an axial pulling action on the brake cable.

* * * * *